United States Patent

[11] 3,543,628

| [72] | Inventor | Artorige Chiesa<br>Vigevano, Pavia, Italy |
|---|---|---|
| [21] | Appl. No. | 725,076 |
| [22] | Filed | April 29, 1968 |
| [45] | Patented | Dec. 1, 1970 |
| [32] | Priority | Feb. 14, 1968 |
| [33] | | Italy |
| [31] | | No. 12742/68 |

[54] DEVICE FOR CONTROLLING THE MOVABLE TABLE OF A PUNCH PRESS
5 Claims, 2 Drawing Figs.

| [52] | U.S. Cl. | 83/525, 83/529, 83/639 |
|---|---|---|
| [51] | Int. Cl. | B26d 5/12 |
| [50] | Field of Search | 83/529, 530, 525, 524, 526, 639; 100/257 |

[56] References Cited
UNITED STATES PATENTS

| 2,821,670 | 1/1958 | Bradley | 83/525X |
| 3,052,145 | 9/1962 | Mueller et al. | 83/530X |
| 3,280,685 | 10/1966 | Derrah et al. | 83/529X |
| 3,361,022 | 1/1968 | Mercaldi et al. | 83/529 |

FOREIGN PATENTS

| 645,970 | 7/1962 | Canada | 83/530 |

Primary Examiner—Frank T. Yost
Attorney—Woodhams, Blanchard and Flynn

ABSTRACT: A press having a stationary table and a further table movable toward and away from the stationary table by means of a fluid pressure cylinder. The movable table has an adjustable stop member mounted thereon which coacts with a switch stationarily mounted relative to the fixed table for controlling the flow of pressurized fluid to the fluid pressure cylinder.

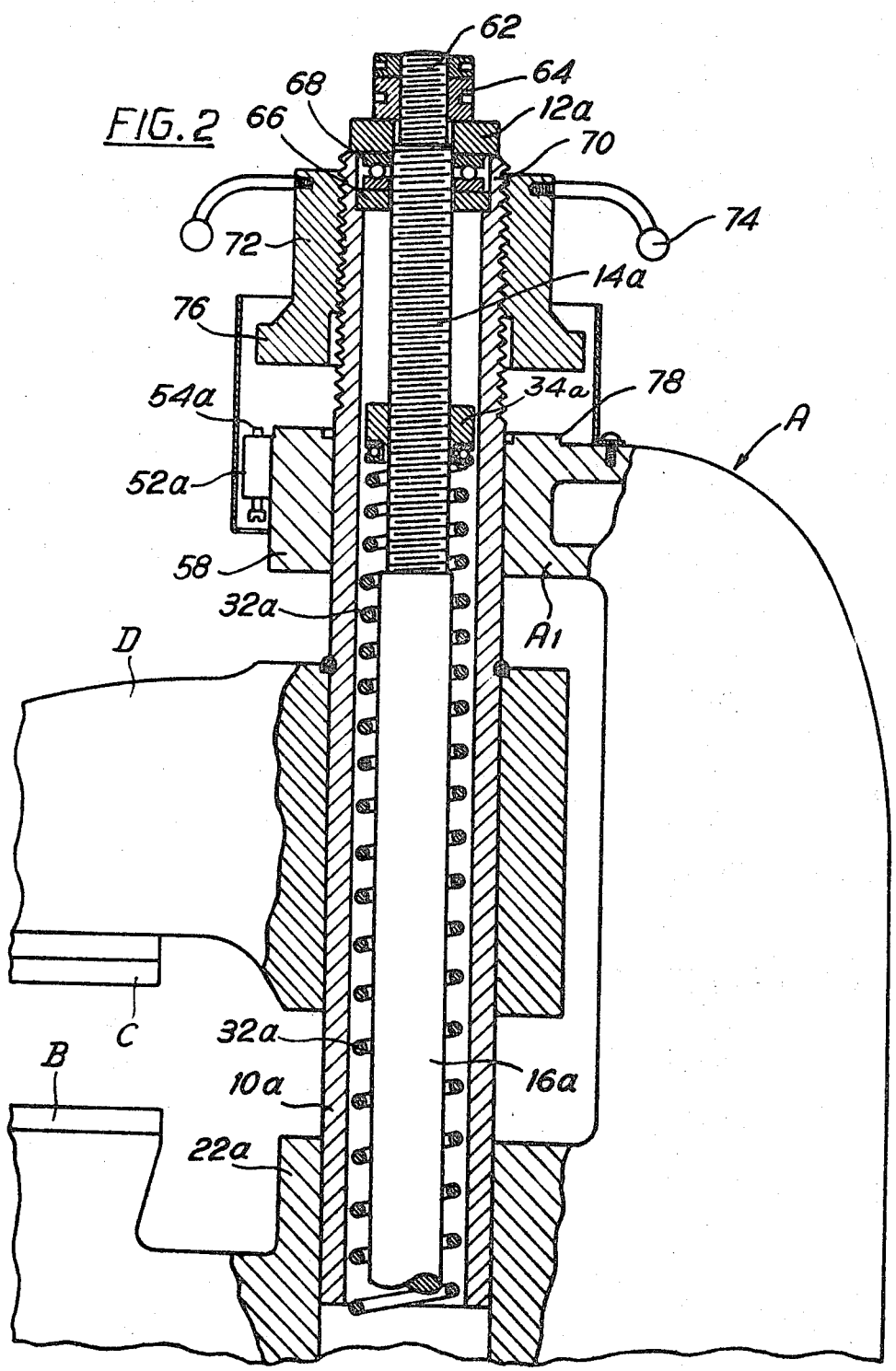

3,543,628

DEVICE FOR CONTROLLING THE MOVABLE TABLE OF A PUNCH PRESS

The present invention concerns a device for use in hydraulic presses to control and stop the traverse motion of the movable table of such presses as desired and with greatest precision.

With particular, but not exclusive reference to punching presses, in which the invention can be advantageously used, modern presses require that the movable table and, therefore, also the tool or punch, stop in an exact position, corresponding to the finished cut into the material, without damaging even slightly, the material of the fixed table onto which the material is put.

For these purposes said table is provided with a layer of suitable material which —provided that it does not damage the cutting blade —undergoes a quick war, wear, due to the unavoidable penetration of the cutting blade into this layer.

Therefore, it is practically impossible to maintain in conventional punching presses, the surface of the block, for a certain time, even and smooth and therefore, it is necessary to level or to substitute said surface after a short time. This drawback increases for the reason that it is necessary to substitute the tool during the processing operation of the same material, by other tools, the involutes of which are different. Therefore, it is necessary to change, as well, the setting of the feed of the cylinder piston unit of the press. Several attempts have already been made to obviate such drawbacks by interrupting the feed of the press by means of electric cutouts, said cutouts consisting either of the tool, or of the metal surface of the block. Even though said solution is satisfactory, it requires, however, on the one hand, particularly sensitive and complicated electric circuits for extremely weak electric currents, on the other hand, the metal surface of the block causes the deterioration of the tool cutting blade.

Other cutouts avail themselves of the pressure changes or of the resilient deformation of the press which take place as soon as the tool finishes the cut.

However, said known systems would not consent always to stop the traverse motion of the tool each time in the desired position. When it is necessary to substitute a tool with another one having different involutes, it is necessary to complete the press with a pressure regulator which must be operated each time, that is according to the involutes of the cutting tool and to the features of the material to be processed by skillful workers.

The present invention consents to equip a press of the above described type in such a way that said press interrupts the feed of the tool directly and exactly in such time, in which the cutting blade finishes the cut into the material secured to the press fixed table or block.

The present invention which is advantageously provided with a cylinder piston unit, inserted between the movable and the fixed press table, whereby said unit is advantageously fed, through a distributor, with the compressed liquid, is characterized by two member units inserted between the fixed and the movable press table, such units being driven by the motion of the said movable table in such a way that the first unit pressure generator actuates the distributing members lying between said cylinder piston unit and that the second unit controls the traverse motion of the movable table, to stop the tool, as soon as its blade completes the cut into the material secured to the press table, in such a way that, just before the completion of the cut, the liquid pressure interrupts the feed of the cylinder piston unit and thereupon, or at the same time, also the traverse motion of the movable table.

The inventive idea can lead, in the practice, to different embodiments of the device, all lying within the limits of the present invention, also having regard to the structural characteristics of the press on which said device is mounted.

According to the invention, adjustable members are inserted between the two locking units and the movable press table, designed to lock the table in the desired final position. According to a first advantageous embodiment of the device, in which the distributor inserted between the pressure generator and the cylinder piston unit of the press is driven by means of electromechanical members, said device has a plurality of contacts, each of which is set in a preestablished position, along the path of the movable press-table and equipped with a corresponding locking member for said movable table, in such a way that the feed of the cylinder piston unit of the press is shifted toward the outlet, as soon as the traverse motion of the movable table is locked or almost locked.

According to a different embodiment of the device the column which retains the movable press-table includes screw or bolt-and-screw members which cooperate with a locking projection on the press-frame, as well as with members, preferably with electric members to control the drive of the press-distributor. The present invention will now be schematically described, with reference to the annexed drawings, in which:

FIG. 2 is a cross section through the upper part of the press, equipped with a modified embodiment of the device.

Figure 1:
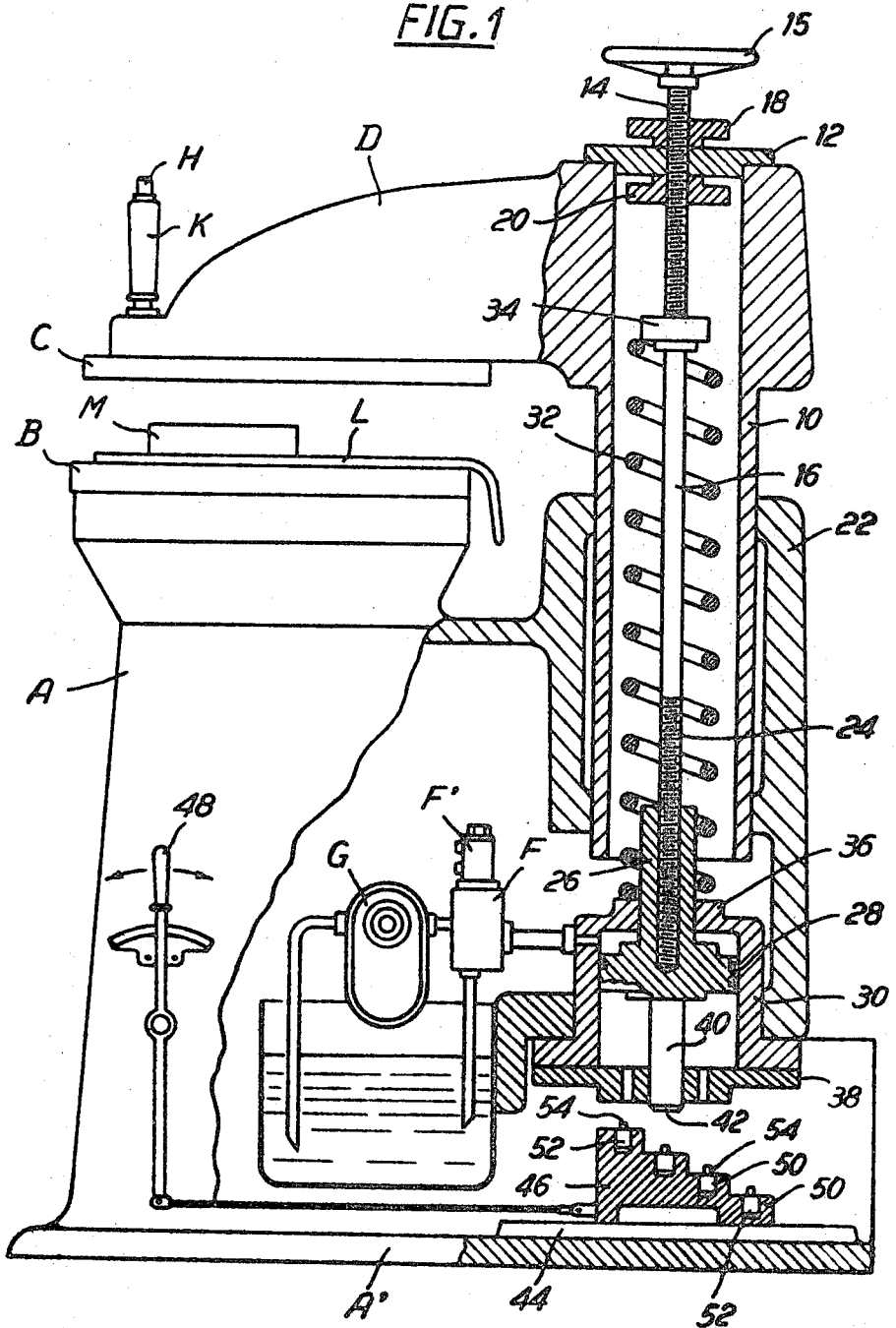
FIG. 1 is a cross section through the punching press equipped with the device of the present invention, according to a first embodiment.

Now with reference to FIG. 1, it appears that the press frame A is equipped with a fixed table B lying opposite to the movable table C. The movable table is retained by a bracket D equipped, in the known manner, with a drilled column, the upper end of which is closed by means of a plate 12.

The upper end 14 of a rod 16 is equipped with a control handwheel 15 and with a threading, said rod being arranged in column 10 and connected, by means of an adjusting ring 18, and a counteradjusting ring 20, to plate 12, whereby said rings connect said rod 16 with said bracket D. Column 10 is slidably arranged in a tube 22 embodied in frame A. Said column is shifted by means of a threaded length 24 provided in the other end of said rod 16, i.e. by means of a piston 28, the stem of which consists of a bushing 26 wherein screwed is the abovementioned length 24. Piston 28 slides tightly in a cylinder 30 secured to frame A. A spring 32 surrounds rod 16, and its ends are retained by an adjustable collar 34 integral with said rod and by the bottom 36 of cylinder 30, respectively, in such a way that the movable table C is spaced away from the fixed table B. The other end of cylinder 30 is closed by a lid 38 provided with a hole which forms a guide for counterrod 40 integral with piston 28, the lower end of which terminates with a head 42.

The lower chamber of the cylinder piston unit 28—30 is constantly connected to the atmosphere, whereas the upper chamber connects through a distributor F with pump G. Distributor F is power operated by a remote servocontrol F', for instance by an electromagnet, the feed of which is under the control of switches, one of which (H) is provided in the handle K to shift the table sideways.

The bottom plate A' of the frame provides guides 44 for a slider 46, operated by a remote control, for instance by means of a displaceable lever 48 hinged to frame A.

The upper part of slider 46 is provided with steplike abutments, each of which has an advantageous height, to form the connecting surface for head 42 of counterrod 40, to lock piston 28 in the desired position. Each of abutments 50 is associated with an electric switch 52, for instance, with a self-acting microswitch advantageously fixed to slider 46, in such a way that the control member 54 of said slider is operated by said counterrod 40 or otherwise, by a member fixed to said counterrod.

Switches 52 are connected in series and they are normally closed; furthermore, said switches are connected in series with switch H, which is normally open.

The above described press operates as follows: first of all the operator provides to set the mutual position of the fixed plate B and the movable plate C of the press, acting on the small handwheel 15 and on the setting rings 18, 20, according to the thickness of the material L and to the characteristics of tool M. Thereupon the operator provides to set the position of slider 46, by acting on lever 48, to aline one of abutments 50 and the corresponding switch 52 with head 42 of rod 40. When the press is out of operation, the pressure side of pump G connects, through distributor F, with the outlet, whereby the action exerted by spring 32 maintains table C in lifted position. When the operator closes switch H, the electric magnet F is operated and, thereupon, also distributor F, to connect the outlet of pump G with the pressure chamber of the cylinder piston unit 28—30. Thus the movable table C is lowered and, together with said table, also tool M, which penetrates into material L to be cut. As the cutting blade of tool M approaches the surface of the fixed table B, also head 42 of rod 40 is close to the alined abutment 50 of slider 46, as well as to the control member 54 of the corresponding microswitch 52; the subsequent, limited displacement of said tool operates the microswitch, to open the feeding circuit of electromagnet F, thus connecting the outlet with the cylinder piston unit 28—30. Simultaneously or with a slight advance, the head engages abutment 50 of slider 46, thus interrupting immediately the feed of the tool, while the movable table C is lifted, thanks to the action of spring 32.

In another embodiment, shown in FIG. 2, a column 10a secured to bracket D performs a sliding motion guided in two tubes 22a and 58 provided on the frame of press A and arranged at fixed table B and at one of the ends of a bracket $A_1$ arranged above said bracket D.

Inside the hollow column 10a extends a rod 16a, the lower end of which is integral with piston stem of the cylinder piston unit of the press. The upper end of said rod has two threaded lengths 14a and 62 of different diameters, the first of which retains a threaded ring 34a, to compress, more or less, a spring threaded on said rod and the other end of which is anchored to the frame of the press.

The threaded end 62 retains several screwnuts cooperating with a drilled plate 12a, which retains, through a counterplate 66, a bearing 68 allowing the rotational movement of the hollow column 10a, in such a way, that bracket D is displaced with respect to the fixed table B. The hollow column 10a has, at its upper end, a threaded length 70, to connect with a screw bushing 72, provided with a small control wheel 74, the lower end of which presents a collar 76, to cooperate with a projection 78 of the upper side of tube 58, to provide a stop for the movable table C. A microswitch 52a is advantageously secured to tube 58 and the pushbutton 54a of said switch is controlled by collar 76, when column 10a moves in axial direction. The operation of said device is identical with the operation of the above described device.

The punching press as illustrated is prepared for the work to be performed by disposing, first of all, collar 76 at an advantageous distance from the projecting stop 78, i.e. depending on the height of the tool or the punch. This adjusting operation is easy and quick to perform, as required when one punch has to be substituted with another punch, by acting on bushing 72.

Since the piston of the cylinder piston unit is integral with rod 16a, said rod is moved downward together with column 10a and with bracket D, when a compressed liquid is fed into the upper chamber of said unit. Thanks to said displacement, collar 76 moves near pushbutton 54a of microswitch 52a, to operate in such a way the distributor which cuts off the feed of the cylinder piston unit of the press; thereafter, i.e. in immediate succession, said collar engages projection 78, to stop the displacement of the movable table C, whereby said stop action takes place smoothly and with the greatest exactness, since the electric valve F has already provided to interrupt the connection between pump G and the pressure chamber of the cylinder piston unit. Thereafter said pressure chamber is connected to the outlet, in such a way that the action exerted by the precompressed spring 32a returns bracket D, together with the corresponding parts, to the above mentioned initial position, whereafter the punching press is ready to start the above described working cycle.

In the case in which the movable parts of the press have a certain mass and in order to prevent the forces of inertia and the resilient actions from displacing tool M, provision is made to operate switch 52 with an advantageous advance, to prevent the penetration of the cutting blade into the material of the block on the fixed table B, without prejudice to the cut or punching of material L.

The substitution of the tools is easy to perform, even if said tools are of different heights, since said substitution is aided by the displacement of slider 46, for the purpose to aline head 42 with the desired unit consisting of abutment 50 and switch 52. The work of the tool is complete and excellent, even when the involutes of the single tools used are different from each other.

The device of the present invention can be modified, according to the different end uses of the press, of the material to be processed, and so on. For instance, it is possible to alter the position of the control device 54 of each microswitch 52, as well as that of abutments 50 with the aid of the appropriate adjustable members, either to anticipate or to delay the intervention of distributor F with respect to the engagement of head 42 against abutment 50. For this purpose head 42 can be provided with a threaded rod one end of which acts on the control member 54 of microswitch 52, i.e. in advance or with a certain delay with respect to the engagement head 42 with abutment 50, to ensure in such a way the necessary working conditions.

The device can be equipped with only one switch 52, retained, in this case, by head 42 in such a way that the movable member of said switch engages abutment 50 of slider 46. Likewise, also members 42—50 can be differently shaped or arranged, also having regard to the circumstance that said members can be incorporated in the press according to the invention. From this point of view the present protection extends to presses equipped with a single or double effect cylinder piston unit, in particular to a punching press, incorporating the device of the present invention. Notwithstanding the above mentioned and other possible modifications, the domain of the present invention and, therefore, of this application is not overcome.

I claim:
1. A punch press comprising:
 frame means including a first table;
 column means slideably supported on said frame means and having a second table secured thereto for movement toward and away from the first table;
 fluid pressure cylinder means connected to the second table for causing movement of the second table toward the first table; and
 means for adjustably controlling the amount of movement of the second table toward the first table and for interrupting the movement of the second table toward the first table when the second table reaches a predetermined position, said last-mentioned means including:
 a. an elongated shaft portion fixedly secured to and extending axially of the column means;
 b. a stop member and means adjustably mounting said stop member on said elongated shaft portion for permitting the axial position of the stop member relative to the column means to be selectively adjusted; and
 c. switch means mounted on one of said stop member and said frame means and directly coacting with the other of said stop member and said frame means for controlling activation of said fluid pressure cylinder means, said switch means being actuated when said second table reaches said predetermined position relative to the first table for deactivating said cylinder means.

2. A press according to claim 1, in which the elongated shaft portion extends outwardly beyond the second table in the direction opposite from the first table, and the frame means including a stationary support member disposed adjacent the side of the second table opposite the first table for slideably engaging and supporting said elongated shaft portion, and said switch means being mounted on said support member with said switch means being adapted to be contacted by said stop member when said second table reaches said predetermined position.

3. A press according to claim 2, in which the second table is disposed above and is movable substantially vertically downwardly toward the first table, and in which the column means includes a substantially vertically elongated hollow tubular member slideably received within said frame means and extending upwardly beyond the second table, the second table being fixedly secured to the hollow tubular member for slideable movement therewith, said elongated shaft portion being integral with said column means and comprising the upper extending end of the hollow tubular member, and said stop member being threadably engaged with the upper end of said hollow tubular member.

4. A press according to claim 3, in which the fluid pressure cylinder means is disposed adjacent the lower end of the hollow tubular member, said cylinder means including a movable piston fixedly interconnected to said hollow tubular member for causing vertical sliding movement thereof.

5. A press according to claim 2, in which the elongated shaft portion is integral with and comprises one end portion of the column means, and said stop member comprising a sleevelike member threadably engaged with the column means for permitting selected axially adjustment therebetween.